United States Patent Office 3,798,202
Patented Mar. 19, 1974

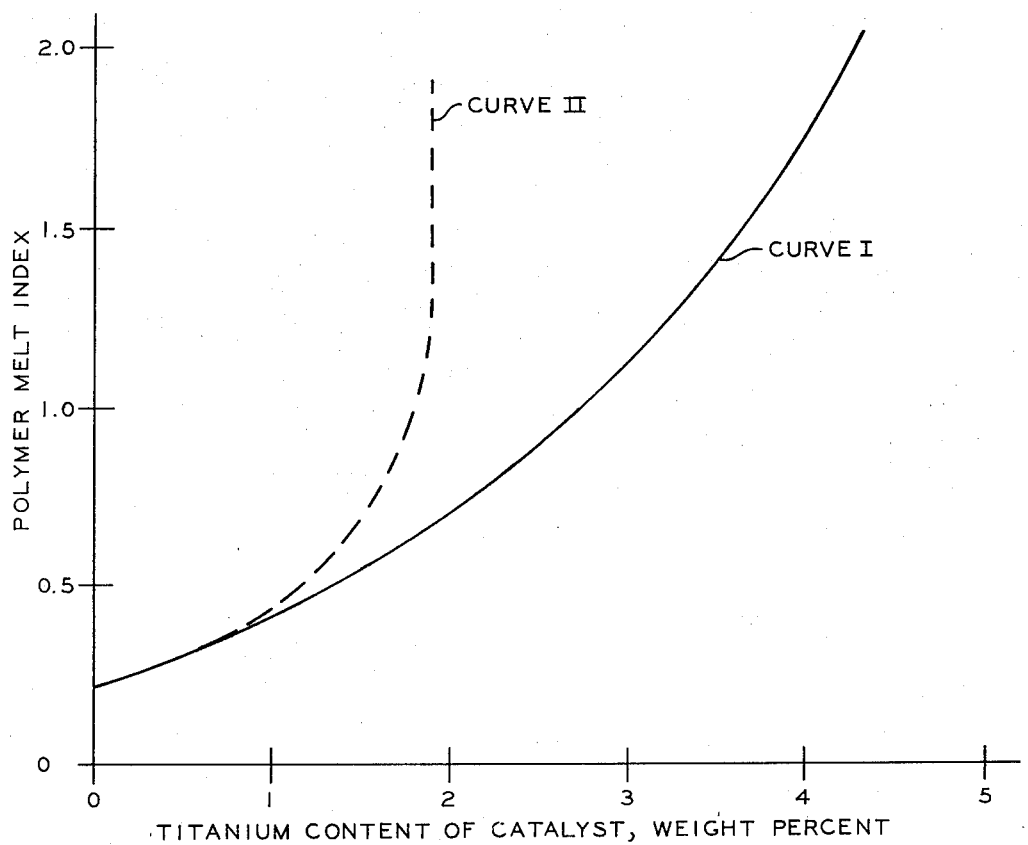

3,798,202
POLYOLEFIN PRODUCTION
Benny E. Nasser, Jr., Bartlesville, Okla., assignor to
Phillips Petroleum Company
Filed Oct. 12, 1971, Ser. No. 188,186
Int. Cl. B01j 11/06; C08f 15/00, 1/66
U.S. Cl. 260—88.2 R                           9 Claims

ABSTRACT OF THE DISCLOSURE

A catalyst and a method of employing that catalyst are disclosed, the catalyst being comprised of a mixture of two supported catalysts active for olefin polymerization, the catalysts differing in respect to their titanium contents.

This invention relates to polyolefin production.

In one of its more specific aspects, this invention relates to the production of polymers by the polymerization of 1-olefins and to a catalyst for producing them.

The production of polymers by contacting olefins with a catalyst to produce polymers is well known as evidenced by U.S. Pats. 2,825,721 and 3,087,917 and British Pat. 853,414, incorporated herein by reference. These patents set forth the nature and operating conditions involved in the polymerization process and the chromium-containing catalysts hereinafter described.

U.S. Pat. 2,825,721 discloses a solution process, with U.S. Pat. 3,087,917 disclosing a particle-form process wherein olefin is contacted with a catalyst in the presence of a diluent at a temperature such that substantially all of the polymer produced is insoluble in the diluent.

Chromium-containing catalysts such as described in the aforementioned patents have been modified in various ways to alter the properties of the polymer product. One method of modifying such catalysts involves depositing on a catalyst comprising chromium oxide on a support selected from the group consisting of silica, alumina, silica-alumina, zirconia and thoria, a titanium compound, titanium being present in the final catalyst in an amount within the range of from about 1 to about 10 weight percent.

It has now been determined that a catalyst possessing unusual properties can be prepared by combining chromium-containing catalysts possessing different concentrations of titanium. Employing the resulting catalyst in polymerization processes produces unusual polymers. This invention pertains to that catalyst and to that process.

According to the present invention there is provided a polymerization catalyst suitable for the polymerization of 1-olefins which comprises a mixture of a first and second catalyst. The first catalyst consists essentially of chromium oxide on a support selected from the group consisting of silica, alumina, silica-alumina, zirconia and thoria, a portion of the chromium being in the hexavalent state or convertible thereto. The second catalyst consists essentially of a similar chromium oxide and a titanium compound on a support selected from the group consisting of silica, alumina, silica-alumina, zirconia and thoria. The mixture will consist essentially of chromium oxide and a titanium compound on a support, the titanium compound being present in the mixture in an amount sufficient to affect the nature of the polymer produced.

Also according to the present invention, there is provided a polymerization process which employs the aforementioned catalyst in the process of polymerization of 1-olefins.

Also according to the present invention, there is provided a method of producing a catalyst which comprises mixing the aforementioned first and second catalysts.

The nature of the results of this invention are illustrated on the attached graph.

This invention is applicable to those polymerization catalysts and processes described in the aforementioned patents. Generally, the invention is applicable to a chromium oxide-containing catalyst supported as described, in which at least a portion of the chromium is convertible to, or has been converted to, the hexavalent state.

This invention can employ any suitable titanium-containing compound in any form and is particularly suitable to the employment of titanium compounds such as those set forth in application Ser. No. 661,846 filed Aug. 21, 1967, now U.S. Pat. 3,622,521. Relatedly, the titanium compound can be incorporated into the catalyst in any suitable method and preferably such that the ultimate catalyst contains from about 1 to about 10 weight percent titanium, although catalysts of any desired titanium concentration can be employed.

The chromium moiety of the catalyst, that is, the chromium of either of the two catalysts combined to form the ultimate catalyst mixture, can be deposited on the catalysts from an aqueous or nonaqueous solution. It is necessary that the impregnated support be substantially free of water before impregnation with the organic titanium compound.

The ultimate catalyst of this invention comprises a mixture of what shall be termed herein as first and second catalysts. The first catalyst consists essentially of chromium oxide on one of the aforementioned supports, a portion of the chromium having been converted or being convertible to the hexavalent state. The second catalyst consists essentially of chromium oxide and a titanium compound, a portion of the chromium having been converted or being convertible to the hexavalent state. Inasmuch as it is impossible to designate the exact state in which the titanium is present on the support, the term "titanium compound" will be used herein to designate the presence of the titanium, regardless of the catalytic form in which it exists or the procedure by which it is deposited on the support.

It is not necessary that the first catalyst contain no titanium. It is necessary only that it contain less titanium than contained in the second catalyst. Preferably, the quantity of titanium contained in the first catalyst will be insufficient to alter the nature of the polymer from that which would be produced by the first catalyst in the substantial absence of titanium.

It is to be understood that the nature of the supports as well as the chromium content of the first and second catalysts can differ. Also, the method by which the chromium is deposited and/or subsequently activated in the preparation of the first and second catalysts can differ.

The composition of the mixture of the first and second catalysts can be of any proportions of the two catalysts and is not limited in any respect in relation thereto except as regards the property of the polymer product desired. This is to say that while 50/50 weight ratios of the first and second catalysts are conveniently employed, any weight ratios can be used.

The mixture of the first and second catalysts can be formed in any convenient manner. Preferably, it will be formed by dry-mixing the two catalysts, each of the two catalysts being in an activated state at the time of being mixed with no subsequent activation being required thereafter. In the alternate, however, the two catalysts can be mixed in the unactivated state with the mixture thus formed being activated thereafter.

The catalyst of the invention and its employment in the method of this invention for polymerizing olefins is illustrated by the following, which illustration is not to be considered as limiting the scope of the invention.

In all instances the catalysts and catalyst mixtures concerned were employed in a process to polymerize 1-butene and ethylene mixtures comprising about 11 to 15 percent 1-butene at about 190° F. and about 330 p.s.i.g., and at polymer production yields of about 3,000 pounds of polymer per pound of catalyst, it being intended to produce polymer products having densities of about 0.928 g./cc.

The first, or chromium-containing catalyst, contained about 1 weight percent chromium on a silica-alumina support and had been prepared by conventional methods of deposition of the chromium compound on the support and subsequent activation at 1400° F. This catalyst is referred to in the data as "Catalyst Cr."

The second, or chromium-titanium-containing catalyst, was formed by impregnating chromium-containing catalyst described above, "Catalyst Cr," with an organic titanium compound from an organic solvent and thereafter activating the resulting composite at 1400° F. in the manner employed in the activation of the chromium-containing catalyst. This catalyst is referred to in the data as "Catalyst Cr-Ti." This catalyst contained about 4.3 weight percent titanium.

A third catalyst, a chromium-titanium catalyst, was prepared in the manner employed to produce "Catalyst Cr-Ti," except that it contained only about 1.6 weight percent titanium. This catalyst was individually employed for polymerization in a manner substantially identical to that in which the other catalysts herein concerned were employed. It produced a polymer having a melt index of 0.58 in Run No. I.

Mixtures of the first, or chromium-containing catalyst, and the second, or chromium-titanium-containing catalysts, were prepared by dry-mixing the two catalysts to obtain a mixture of substantially uniform composition.

Polymerizations were carried out under substantially identical conditions employing the individual catalysts and the mixtures of the first and second catalysts with the following results:

| | Wt. of catalyst | | Percent Ti on catalyst | Melt index of polymer |
|---|---|---|---|---|
| | Cr | Cr-Ti | | |
| Run number: | | | | |
| I | 0 | 100 | 1.6 | 0.58 |
| II | 0 | 100 | 4.3 | 2.10 |
| III | 56 | 44 | 1.9 | 1.2 |
| IV | 57 | 43 | 1.85 | 1.5 |
| V | 58.2 | 41.8 | 1.8 | 1.05 |
| VI | 70 | 30 | 1.3 | 0.505 |
| VII | 100 | 0 | 0 | 0.22 |

These data are graphically presented on the attached figure. This graph shows two curves. Curve I indicates the melt index of polymers formed employing a chromium-containing catalyst containing a titanium content range of 0 to about 4.3 percent, the titanium being incorporated in the catalyst by impregnation. This curve represents Runs I, II and VII.

Curve II indicates the melt index of polymers formed employing chromium-containing catalysts having various titanium contents, the catalyst being a mixture of a first supported component consisting essentially of chromium and substantially devoid of titanium (the "Catalyst Cr"), and a second component consisting essentially of supported chromium and titanium (the "Catalyst Cr-Ti"), the amount of the individual catalysts selected for inclusion in the mixture being a function of the titanium content desired in the ultimate catalyst mixture. This curve represents Runs III–VI.

It will be seen from these data that the catalyst of this invention and the method of employing that catalyst in olefin polymerization produces polymers having far greater melt index than that catalyst produced by the conventional method of titanium incorporation into a chromium-containing catalyst.

Specifically, whereas a catalyst containing about 1.9 weight percent titanium, the titanium being incorporated in the ultimate catalyst by impregnation, would be expected to produce a polymer having a melt index of about 0.67 as seen in Curve I, a catalyst containing about 1.9 weight percent titanium, the titanium being incorporated in the ultimate catalyst by the method of this invention, produced a polymer having a melt index of 1.9 as seen in Curve II, all other conditions being substantially identical.

It will be evident from the above discussion that various modifications may be made to the method of this invention. However, such are considered to be within the scope of the invention.

What is claimed is:
1. A composition comprising a mixture of:
  (a) a first supported catalyst active for olefin polymerization, said first supported catalyst consisting essentially of a support and a chromium-containing compound; and,
  (b) a second supported catalyst active for olefin polymerization, said second supported catalyst consisting essentially of a support, a chromium-containing compound and a titanium-containing compound, each of said first and said second supported catalysts being supported on a support selected from the group consisting of silica, alumina, silica-alumina, zirconia and thoria.

2. The composition of claim 1 in which said mixture contains from about 1 to about 10 weight percent titanium.

3. The composition of claim 1 in which said chromium-containing compound of said first and said second supported catalysts consists essentially of chromium oxide.

4. The composition of claim 1 in which said mixture is comprised of said first and said second supported catalysts in about equal weight ratios.

5. The composition of claim 1 in which said first supported catalyst contains about 1 weight percent chromium.

6. The composition of claim 1 in which said second supported catalyst contains about 1 weight percent chromium and about 4.3 weight percent titanium.

7. A method of catalytically polymerizing a 1-olefin which comprises employing as the catalyst the composition of claim 1.

8. A method of catalytically polymerizing a 1-olefin which comprises employing as the catalyst the composition of claim 6.

9. A method according to claim 7 wherein said polymerization is carried out in a diluent at a temperature such that substantially all of a polymer produced is insoluble in the diluent.

References Cited
UNITED STATES PATENTS

| 3,127,370 | 3/1964 | Head | 260—94.9 D |
| 3,351,623 | 11/1967 | Walker et al. | 260—94.9 D |
| 3,622,521 | 11/1971 | Hogan et al. | 260—94.9 D |
| 3,485,771 | 12/1969 | Horvath | 260—94.9 D |

JOSEPH L. SCHOFER, Primary Examiner

A. HOLLER, Assistant Examiner

U.S. Cl. X.R.

252—458, 469; 260—93.7, 94.9 D